(12) United States Patent
Pfeil

(10) Patent No.: US 11,221,624 B2
(45) Date of Patent: Jan. 11, 2022

(54) METHOD AND DEVICE FOR OPERATING AN AUTOMATED VEHICLE

(71) Applicant: Robert Bosch GmbH, Stuttgart (DE)

(72) Inventor: Jerg Pfeil, Cleebronn (DE)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 16/540,710

(22) Filed: Aug. 14, 2019

(65) Prior Publication Data
US 2020/0073383 A1 Mar. 5, 2020

(30) Foreign Application Priority Data

Aug. 31, 2018 (DE) .......................... 102018214878.3

(51) Int. Cl.
  *G05D 1/00* (2006.01)
  *B60W 30/09* (2012.01)
  *B60W 50/00* (2006.01)
  *G05D 1/02* (2020.01)
(52) U.S. Cl.
  CPC ........... *G05D 1/0088* (2013.01); *B60W 30/09* (2013.01); *B60W 50/00* (2013.01); *G05D 1/0212* (2013.01); *B60W 2050/0028* (2013.01); *B60W 2556/00* (2020.02)
(58) Field of Classification Search
  CPC .......................... G05D 1/0088; G05D 1/0212
  See application file for complete search history.

(56) References Cited

U.S. PATENT DOCUMENTS

2019/0220029 A1* 7/2019 Fukuhara ............ G06K 9/00805
2020/0065443 A1* 2/2020 Liu ......................... H04W 4/44

FOREIGN PATENT DOCUMENTS

DE       102014018187 A1      6/2015

OTHER PUBLICATIONS

Bock, T., et al., "Vehicle in the Loop: EIN Innovativer Ansatz Zur Kopplung Virtueller Mit Realer Erprobung", Automobiltech Z, 2008, vol. 110, pp. 10-16. https://doi.org.10.1007/bf0321943.

* cited by examiner

*Primary Examiner* — Peter D Nolan
*Assistant Examiner* — Mikko Okechukwu Obioha
(74) *Attorney, Agent, or Firm* — Norton Rose Fulbright US LLP; Gerard Messina

(57) ABSTRACT

A method and a device for operating an automated vehicle are provided. The method includes a step of receiving a first position of the automated vehicle, a step of receiving environment data values, the environment data values representing an environment of the automated vehicle, a step of detecting at least one further vehicle in the environment of the automated vehicle, and a step of generating a digital environment model, starting from a digital map, based on the environment data values and as a function of the first position of the automated vehicle. The environment model comprises the automated vehicle, the at least one further vehicle, and at least one simulated object in the environment of the automated vehicle. The method also includes a step of operating the automated vehicle as a function of the digital environment model.

11 Claims, 2 Drawing Sheets

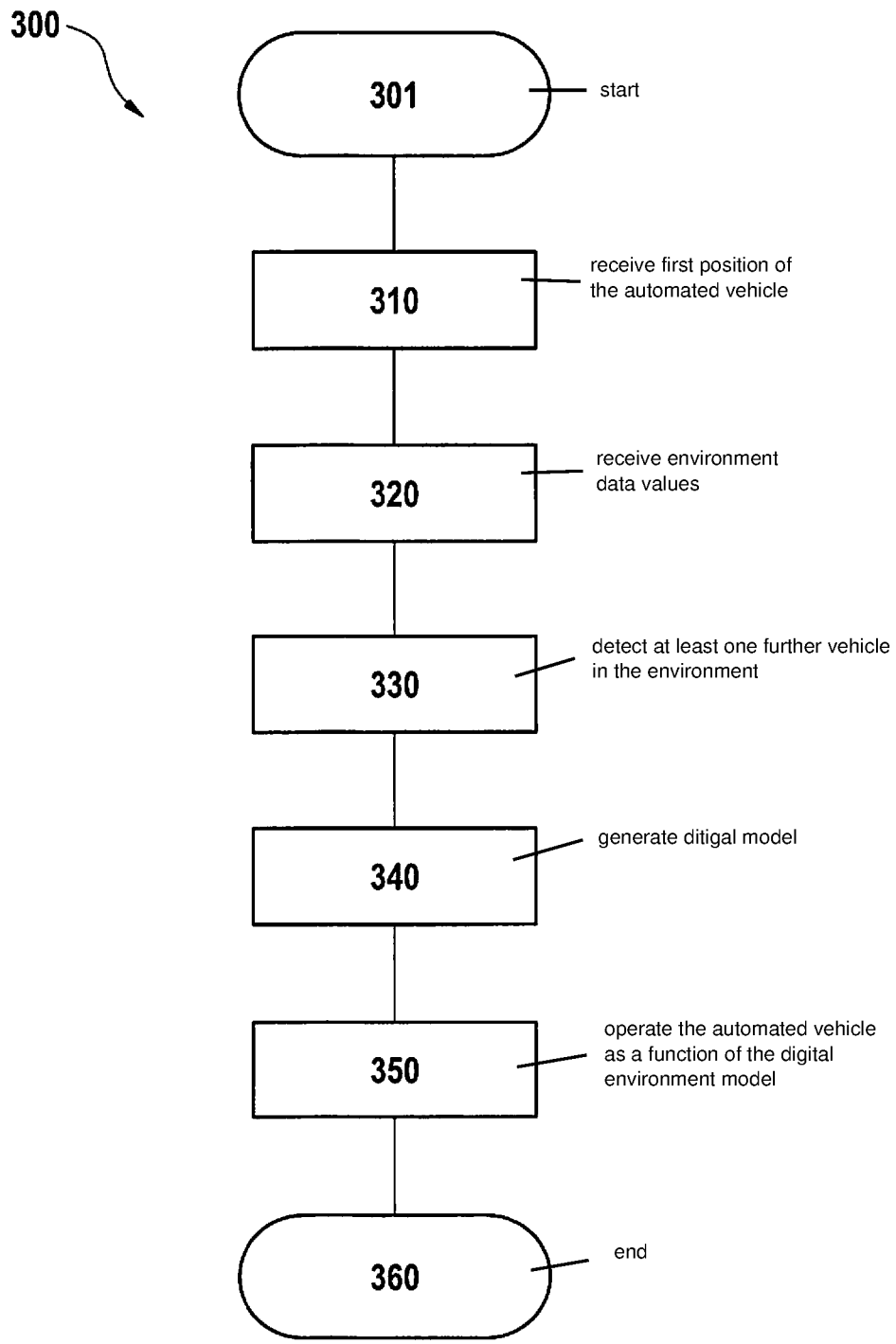

METHOD AND DEVICE FOR OPERATING AN AUTOMATED VEHICLE

CROSS REFERENCE

The present application claims the benefit under 35 U.S.C. § 119 of German Patent Application No. DE 102018214878.3 filed on Aug. 31, 2018, which is expressly incorporated herein by reference in its entirety.

FIELD

The present invention relates to a method and to a device for operating an automated vehicle, comprising a step of receiving a first position of the automated vehicle, a step of receiving environment data values, a step of detecting at least one further vehicle, a step of generating a digital environment model and a step of operating the automated vehicle, as a function of the digital environment model.

SUMMARY

The method of the present invention for operating an automated vehicle comprises a step of receiving a first position of the automated vehicle, a step of receiving environment data values, the environment data values representing an environment of the automated vehicle, and a step of detecting at least one further vehicle in the environment of the automated vehicle. The method furthermore comprises a step of generating a digital environment model, starting from a digital map, based on the environment data values and depending on the first position of the automated vehicle, the environment model comprising the automated vehicle, the at least one further vehicle and at least one simulated object in the environment of the automated vehicle. The method additionally comprises a step of operating the automated vehicle as a function of the digital environment model.

An automated vehicle is to be understood as a partially or highly or fully automated vehicle. An operation of the automated vehicle is to be understood for example in the sense that a trajectory is determined as a function of the digital map and/or as a function of the digital environment model and that the vehicle is moved along this trajectory by automated control of a lateral and/or longitudinal control system.

A digital environment model is to be understood for example as a digital simulation of the environment of the automated vehicle, in which in particular distances and/or linear measures and/or relative arrangements of individual objects (automated vehicle and/or at least one further vehicle and/or at least one further object) in the environment with respect to one another correspond to the real distances and/or linear measures and/or relative arrangements. The digital environment model furthermore comprises at least one simulated object. The digital environment model may be designed as a visual representation (for example by way of a visual output unit) of an environment or as data values (without visual representation option).

The at least one simulated object is to be understood for example as an object that is not actually located in the environment of the automated vehicle, but that is inserted by suitable software for example into the digital environment model in such a way (for example by observing the above-mentioned distances and/or linear measures and/or relative arrangements of individual objects in the environment with respect to one another) as if it were a real object. In this instance, the at least one simulated object, based on its shape and/or size and/or speed and/or further object-specific variables, corresponds for example to a road user (pedestrian, vehicle, bicycle, etc.).

The method of the present invention advantageously solves the problem that very many test drives or test data are required for operating an automated vehicle, which under real conditions can only be achieved by using many resources and mustering high costs. The method of the present invention solves this problem by more efficient testing using simulated vehicles for representing secondarily important road users such as, for example, a blocker vehicle, which in this case correspond to the at least one simulated object. These are required in order to set the device by way of the method reliably into the desired case of application or into the necessity of a desired reaction. The method furthermore results in higher efficiency and lower costs in that for example it is possible to avoid having to block off test courses.

Preferably, the at least one further vehicle is detected by way of the driving environment data values and/or the at least one further vehicle is detected in that at least one second position of the at least one further vehicle is received.

Recording the driving environment data values is to be understood for example in that a driving environment sensor system of the automated vehicle detects the environment of the automated vehicle.

An environment sensor system is to be understood for example as at least one video sensor and/or at least one radar sensor and/or at least one Lidar sensor and/or at least one ultrasonic sensor and/or at least one additional sensor that is designed to detect the environment of the automated vehicle in the form of environment data values. The driving environment sensor system furthermore comprises for example a processing unit (processor, main memory, hard disk, etc.), which is designed to evaluated the driving environment sensor values using a suitable software and to detect and/or classify objects (such as for example the at least one further vehicle). In one possible specific embodiment, these objects are detected for example together with the at least one second position of the objects, the second position being determined for example—in the form of a directional vector and/or a distance—relative to the automated vehicle and being transmitted together with the environment data values. In another specific embodiment, the at least one second position of the at least one further vehicle is received in that the at least one second position is transmitted directly by the at least one second vehicle.

This yields the advantage of increasing the quality and thus also the reliability of the digital environment model.

The at least one further vehicle primarily poses a risk of collision for the automated vehicle, and the operation is performed so as to minimize the risk of collision.

This provides the advantage that the method is used in particular to increase the automated vehicle.

The environment model preferably comprises the at least one simulated object in such a way that a driving function for the automated vehicle is tested as a function of the at least one simulated object when operating the automated vehicle.

Preferably, the driving function determines a setpoint trajectory for the automated vehicle as a function of the digital environment model, the operation of the automated vehicle being aborted by the driving function if an actual trajectory of the automated vehicle deviates from the setpoint trajectory according to specified criteria.

The device according to the present invention, which is designed in particular as a processing unit, is set up to perform all steps of the method, is provided.

Moreover, a computer program is provided, comprising commands that prompt a computer, when executing the computer program, to implement a method in accordance with one of the method claims.

Furthermore, a machine-readable storage medium is provided, on which this computer program is stored.

Advantageous further developments of the present invention are described herein.

BRIEF DESCRIPTION OF THE DRAWINGS

Exemplary embodiments of the present invention are depicted in the figures and are explained in greater detail below.

FIG. 2 shows an exemplary embodiment of the method according to the present invention in the form of a flow chart.

DETAILED DESCRIPTION OF EXAMPLE EMBODIMENTS

Figure 1:
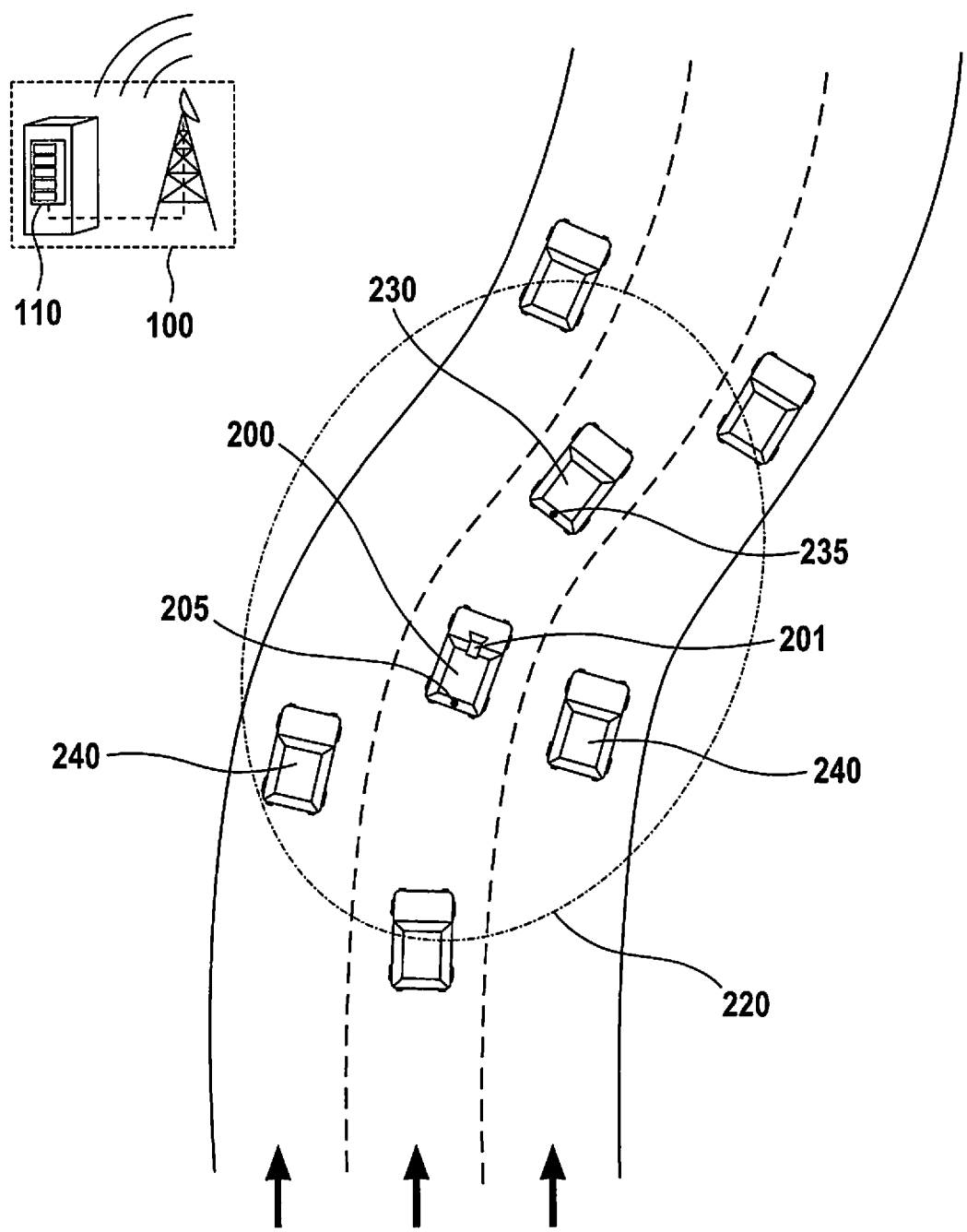
FIG. 1 shows an exemplary embodiment of the method according to the present invention.

FIG. 1 shows a processing unit 100, illustrated by way of example, which comprises a device 110 for carrying out a method 300 for operating an automated vehicle 200. A processing unit 100 is to be understood for example as a server. In a further specific embodiment, a processing unit 100 is to be understood as a cloud, that is, as a network of at least two electrical data processing systems which exchange data via the Internet for example. In another specific embodiment, processing unit 100 corresponds to device 110. In another specific embodiment, device 110 is comprised by automated vehicle 200.

Device 110 comprises for example first means for receiving 310 a first position 205 of automated vehicle 200, second means for receiving 320 environment data values, the environment data values representing an environment 220 of automated vehicle 200, and third means for detecting 330 at least one additional vehicle 230 in the environment 220 of automated vehicle 200. Device 110 furthermore comprises for example fourth means for generating 340 of a digital environment model, starting from a digital map, based on the environment data values and depending on the first position 205 of automated vehicle 200, the environment model comprising automated vehicle 200, the at least one further vehicle 230 and at least one simulated object 240 in the environment 220 of automated vehicle 200. Device 110 furthermore comprises for example fifth means for operating 350 automated vehicle 200 as a function of the digital environment model.

The first means and/or the second means and/or the third means and/or the fourth means and/or the fifth means may be developed in different variants depending on the respective specific embodiment of processing unit 100. If processing unit 100 is developed as a server, the first means and/or the second means and/or the third means and/or the fourth means and/or the fifth means are situated in the same location—with respect to the location of device 110.

If processing unit 100 is developed as a cloud, the first means and/or the second means and/or the third means and/or the fourth means and/or the fifth means may be situated in different locations, for example in different cities and/or in different countries, a connection—such as the Internet for example—being developed for exchanging (electronic) data between the first means and/or the second means and/or the third means and/or the fourth means and/or the fifth means. If processing unit 100 or device 110 is comprised by automated vehicle 200, device 110 is developed as a control unit, for example.

The first means are developed to receive a first position 205 of automated vehicle 200. For this purpose, the first means comprise for example a receiver and/or transmitter unit, by which data are requested and/or received. In another specific embodiment, the first means are developed in such a way that—starting from device 110—they are connected to an externally situated transmitter and/or receiver unit by a wired and/or wireless connection. The first means furthermore comprise for example electronic data processing elements, for example a processor, working memory and a hard disk, which are designed to store and/or process the first position, for example to perform modifications and/or adaptations of the data format and subsequently to transmit it to the fourth means. In another specific embodiment, the first means are developed so as to transmit the received environment data values—without data processing elements—to the fourth means.

The device furthermore comprises second means that are developed to receive environment data values, the environment data values representing an environment 220 of automated vehicle 200. For this purpose, the second means comprise a receiver and/or transmitter unit, by which data are requested and/or received. In another specific embodiment, the second means are developed in such a way that—starting from device 110—they are connected to an externally situated transmitter and/or receiver unit by a wired and/or wireless connection. In one specific embodiment, the second means correspond to at least on specific embodiment of the first means or are the same means.

Device 110 furthermore comprises third means for detecting 330 of at least one further vehicle 230 in the environment 220 of automated vehicle 200. For this purpose, the third means comprise a receiver and/or transmitter unit, by which data are requested and/or received. In another specific embodiment, the third means are developed in such a way that—starting from device 110—they are connected to an externally situated transmitter and/or receiver unit by a wired and/or wireless connection. In one specific embodiment, the third means correspond to at least one specific embodiment of the first means and/or of the second means or they are the same means.

If processing unit 100 or device 110 is comprised by automated vehicle 200, the first means and/or the second means and/or the third means are developed for example as a data interface, which is connected to a transmitter and/or receiver device of automated vehicle 200.

The device furthermore comprises fourth means for generating a digital environment model, starting from a digital map, based on the environment data values and depending on the first position 205 of automated vehicle 200, the environment model comprising automated vehicle 200, the at least one further vehicle 230 and at least one simulated object 240 in the environment 220 of automated vehicle 200.

For this purpose, the fourth means are developed for example as a processing unit having electronic data processing elements (processor, working memory, hard disk) as well as suitable software.

The device furthermore comprises fifth means for operating 350 automated vehicle 200 as a function of the digital environment model. The fifth means are for this purpose developed for example as a transmitter and/or receiver unit and correspond to at least one specific embodiment of the first means and/or second means and/or third means and/or are identical with the first means and/or the second means and/or the third means. Automated vehicle 200 is operated for example in that the digital environment model is transmitted to automated vehicle 200 in such a way that automated vehicle 200 determines—for example using a control unit—a trajectory as a function of the digital environment model. In another specific embodiment, automated vehicle 200 is operated for example in that the fifth means determine a trajectory and the trajectory is transmitted to automated vehicle 200. For this purpose, the fifth means are developed for example as a processing unit having electronic data processing elements (processor, working memory, hard disk) as well as suitable software.

If processing unit 100 or device 110 is comprised by automated vehicle 200, the fifth means are developed for example as a data interface, which is connected to a further control unit of automated vehicle 200, the further control unit being developed for example to operate the automated vehicle 200 in automated fashion, for example by automated lateral and/or longitudinal control.

In one possible specific embodiment, the automated vehicle 200 and/or the at least one further vehicle 230 are for example activated, these vehicles transmitting their positional data (first position 205 and/or the at least one second position 235) to device 110. The positional data are detected for example by dGPS.

Additionally, there are simulated objects 240, which are inserted into the digital environment model, in particular by taking into account certain attributes such as for example a concealed environment, etc.

In another specific embodiment, the simulated objects 240 are inserted for example in that they were previously detected by (real) sensor measurements and stored, and are inserted when needed, in particular as a function of a driving function that is to be tested.

In one specific embodiment, the insertion of simulated objects 240 occurs for example by recreations of reflections of the real environment such as the high-frequency waves in radar, which makes it possible to achieve a close approximation to reality in the recreations.

FIG. 2 shows an exemplary embodiment of a method 300 for operating an automated vehicle 200.

Method 300 begins with step 301.

In step 310, a first position 205 of automated vehicle 200 is received.

In step 320, environment data values are received, the environment data values representing an environment 220 of automated vehicle 200.

In step 330, the at least one further vehicle 230 in the environment 220 of automated vehicle 200 is detected.

In step 340, a digital environment model is generated starting from a digital map, based on the environment data values and as a function of the first position 205 of automated vehicle 200. For this purpose, the environment model comprises automated vehicle 200, the at least one further vehicle 230 and at least one simulated object 240 in the environment 220 of automated vehicle 200.

In step 350, automated vehicle 200 is operated as a function of the digital environment model.

Method 300 ends with step 360.

What is claimed is:

1. A method for operating an automated vehicle, comprising:
   receiving a first position of the automated vehicle;
   receiving environment data values, the environment data values representing an environment of the automated vehicle;
   detecting at least one further vehicle in the environment of the automated vehicle;
   generating a digital environment model, starting from a digital map, based on the environment data values and depending on the first position of automated vehicle, the environment model including the automated vehicle, the at least one further vehicle, and at least one simulated object in the environment of the automated vehicle; and
   operating, via a processing unit, the automated vehicle as a function of the digital environment model;
   wherein the environment model includes the at least one simulated object so that a driving function for the automated vehicle is tested as a function of the at least one simulated object when operating the automated vehicle,
   wherein the driving function determines a setpoint trajectory for the automated vehicle as a function of the digital environment model, and wherein the operation of the automated vehicle is aborted by the driving function when an actual trajectory of the automated vehicle deviates from the setpoint trajectory according to specified criteria, and
   wherein the environment model includes the automated vehicle, the at least one further vehicle, and at least one simulated object in the environment of the automated vehicle.

2. The method as recited in claim 1, wherein the at least one further vehicle is detected using the environment data values and/or the at least one further vehicle is detected in that at least one second position of the at least one further vehicle is received.

3. The method as recited in claim 1, wherein the at least one further vehicle poses a risk of collision for the automated vehicle, and the operation is performed so as to minimize the risk of collision.

4. The method as recited in claim 1, wherein the processing unit includes the automated vehicle, wherein the operating of the automated vehicle uses a data interface, which is connected to a further control unit of the automated vehicle, and wherein the further control unit is configured to operate the automated vehicle in an automated manner, including by automated lateral and/or automated longitudinal control.

5. The method as recited in claim 1, wherein the simulated objects are inserted into the digital environment model by at least one of the following:
   (i) taking into account certain attributes of the objects;
   (ii) previously detected objects, which are detected by sensor measurements and stored, are inserted when needed as a function of a driving function that is to be tested; and/or
   (iii) recreations of reflections of the real environment, including high-frequency waves in a radar, which makes it possible to achieve a close approximation to reality in the recreations.

6. A device for operating an automated vehicle, comprising:
   a processing unit configured to perform the following:
   receiving a first position of the automated vehicle;
   receiving environment data values, the environment data values representing an environment of the automated vehicle;

detecting at least one further vehicle in the environment of the automated vehicle;

generating a digital environment model, starting from a digital map, based on the environment data values and depending on the first position of automated vehicle, the environment model including the automated vehicle, the at least one further vehicle, and at least one simulated object in the environment of the automated vehicle; and operating the automated vehicle as a function of the digital environment model;

wherein the environment model includes the at least one simulated object so that a driving function for the automated vehicle is tested as a function of the at least one simulated object when operating the automated vehicle, and wherein the driving function determines a setpoint trajectory for the automated vehicle as a function of the digital environment model, and wherein the operation of the automated vehicle is aborted by the driving function when an actual trajectory of the automated vehicle deviates from the setpoint trajectory according to specified criteria, and wherein the environment model includes the automated vehicle, the at least one further vehicle, and at least one simulated object in the environment of the automated vehicle.

7. The device as recited in claim 6, wherein the processing unit or the device includes the automated vehicle, wherein the operating of the automated vehicle uses a data interface, which is connected to a further control unit of the automated vehicle, and wherein the further control unit is configured to operate the automated vehicle in an automated manner, including by automated lateral and/or automated longitudinal control.

8. The device as recited in claim 6, wherein the simulated objects are inserted into the digital environment model by at least one of the following:
  (i) taking into account certain attributes of the objects;
  (ii) previously detected objects, which are detected by sensor measurements and stored, are inserted when needed as a function of a driving function that is to be tested; and/or
  (iii) recreations of reflections of the real environment, including high-frequency waves in a radar, which makes it possible to achieve a close approximation to reality in the recreations.

9. A non-transitory machine-readable storage medium having a computer program, which is executable by a processor of a processing unit, comprising:
  a program code arrangement having program code for operating an automated vehicle, by performing the following:
    receiving a first position of the automated vehicle;
    receiving environment data values, the environment data values representing an environment of the automated vehicle;
    detecting at least one further vehicle in the environment of the automated vehicle;
    generating a digital environment model, starting from a digital map, based on the environment data values and depending on the first position of automated vehicle, the environment model including the automated vehicle, the at least one further vehicle, and at least one simulated object in the environment of the automated vehicle; and
    operating the automated vehicle as a function of the digital environment model;
    wherein the environment model includes the at least one simulated object so that a driving function for the automated vehicle is tested as a function of the at least one simulated object when operating the automated vehicle, and
    wherein the driving function determines a setpoint trajectory for the automated vehicle as a function of the digital environment model, and wherein the operation of the automated vehicle is aborted by the driving function when an actual trajectory of the automated vehicle deviates from the setpoint trajectory according to specified criteria, and
    wherein the environment model includes the automated vehicle, the at least one further vehicle, and at least one simulated object in the environment of the automated vehicle.

10. The storage medium as recited in claim 9, wherein the processing unit includes the automated vehicle, wherein the operating of the automated vehicle uses a data interface, which is connected to a further control unit of the automated vehicle, and wherein the further control unit is configured to operate the automated vehicle in an automated manner, including by automated lateral and/or automated longitudinal control.

11. The storage medium as recited in claim 9, wherein the simulated objects are inserted into the digital environment model by at least one of the following:
  (i) taking into account certain attributes of the objects;
  (ii) previously detected objects, which are detected by sensor measurements and stored, are inserted when needed as a function of a driving function that is to be tested; and/or
  (iii) recreations of reflections of the real environment, including high-frequency waves in a radar, which makes it possible to achieve a close approximation to reality in the recreations.

* * * * *